United States Patent [19]

McConnell et al.

[11] Patent Number: 4,812,186
[45] Date of Patent: Mar. 14, 1989

[54] PROCESS FOR THE MANUFACTURE OF CELLULAR CORE LAMINATED ELEMENTS

[75] Inventors: Anthony McConnell, Rawtenstall; Anthony M. Bedford, Ilkely, both of England

[73] Assignee: John Cotton Limited, Colne, England

[21] Appl. No.: 49,557

[22] Filed: May 14, 1987

[30] Foreign Application Priority Data

Oct. 30, 1986 [GB] United Kingdom ................ 8625997

[51] Int. Cl.⁴ .................... B32B 31/20; B32B 33/00
[52] U.S. Cl. ...................................... 156/90; 156/221; 156/224; 156/245; 428/317.1; 428/920; 428/921
[58] Field of Search ................ 156/221, 224, 245, 90; 428/317.1, 920, 921

[56] References Cited

U.S. PATENT DOCUMENTS 4,261,775  4/1981  Tschudin ................... 156/224 X
4,698,252  10/1987  Koch et al. ............ 428/317.1 X Primary Examiner—Robert A. Dawson
Attorney, Agent, or Firm—Fisher, Christen & Sabol

[57] ABSTRACT

A method for the manufacture of a laminated element comprising a thermoformed cellular core material and one or more reinforcing and/or decorative web layers which comprises applying an adhesive coating to said web, placing the thermoformable cellular core material on said coated web to form an intermediate laminated element, and placing the intermediate laminated product without substantial preheating in a heated mould to deform the thermoformable cellular core material to a desired final shape and to cure the adhesive.

8 Claims, 1 Drawing Sheet

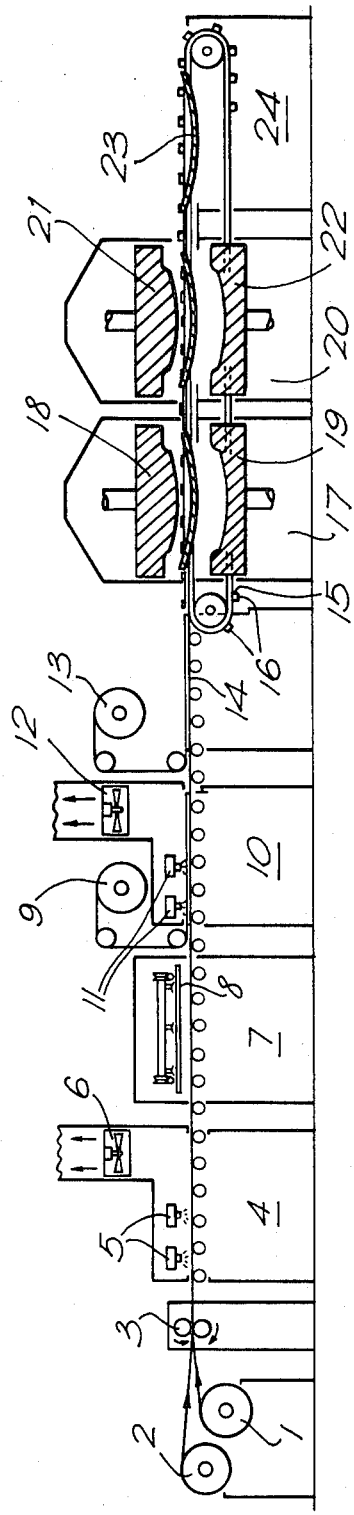

PROCESS FOR THE MANUFACTURE OF CELLULAR CORE LAMINATED ELEMENTS

This invention relates to a process for the preparation of laminated elements and to such elements. In particular, the invention relates to laminated elements incorporating cellular material.

Laminated elements comprising a cellular layer and one or more reinforcing and/or decorative layers are used for example as roof lining panels (so-called "headliners"), door panels and general decorative panels in the automobile and aircraft industries.

Such panels may be manufactured by a large number of hitherto proposed processes. For example, GB-B-2096653 describes a process for the preparation of lightweight, insulating, flexible, rigid or semi-rigid elements which comprises impregnating a flexible open-celled porous material with a solution of an isocyanate compound, reacting the isocyanate with water to form a urea of biuret derivative and cross-linking the isocyanate. The impregnation step may be followed or accompanied by the deposition of a fibrous material on the porous material so that the isocyanate acts as a bonding and embedding agent for the fibres. The surface of the porous material may also be coated with continuous coating material, the isocyanate once again acting as a bonding agent.

It has also been proposed to prepare laminated panels containing a thermoforming cellular material, e.g. of polyurethane foam, as the core material, by pre-heating the thermoforming material to a temperature at which the material can be moulded, and then placing the pre-heated material into a mould which has also been pre-heated to the thermoforming temperature. Before placing the core material in the mould, the mould surfaces are provided with any desired reinforcing and/or decorative layers for the final product, and these layers are coated with an appropriate adhesive for bonding to the core material. Closure of the mould then serves to bond the reinforcing and/or decorative layers to the core material and to form the panels into the desired final shape.

We have now discovered an economic and simple method of manufacturing laminated elements containing a thermoformable cellular core material which avoids preheating the material before a moulding step.

Thus, in accordance with one aspect of the invention, there is provided a method for the manufacture of a laminated element comprising a thermoformable cellular core material and one or more reinforcing and/or decorative web layers which comprises applying an adhesive coating to said web, placing the thermoformable cellular core material on said coated web to form an intermediate laminated element, and placing the intermediate laminated product without substantial preheating in a heated mould to deform the thermoformable cellular core material to the desired final shape and to cure the adhesive.

According to a preferred embodiment, the method of the invention is used to prepare a laminated element having a scrim or backing layer, a first reinforcing layer, the cellular core layer, a second reinforcing layer and a decorative face layer. In this embodiment, the scrim conveniently comprises a non-woven or woven fabric e.g. of polyester or glass fibre, with a weight of, for example, 10-200 g.m$^{-2}$, preferably 20-60 g.m$^{-2}$. The first reinforcing layer conveniently comprises an organic or inorganic material selected from carbon, boron, polyamide, ceramic, cotton and metal fibres, and preferably a glass fibre mat, generally of non-woven material with a weight of 50-400 g.m$^{-2}$, which is laid over the scrim prior to application of an adhesive coating. An especially preferred material for the reinforcing layer comprises a non-woven chopped glass strand mat with a weight of about 100 g.m$^{-2}$. This material is of generally open texture so that the adhesive passes through the mat and helps to secure it to the scrim. In order to help prevent the adhesive from penetrating the scrim, the latter may be pre-coated on what will become the rear surface of the laminated product with for example a thin film of polyethylene. This coating additionally provides a pleasing finish and increases the strength of the final product. If desired the reinforcement layer may be impregnated with suitable resin before being applied in the method of the invention.

When the first reinforcing layer has been laid over the scrim, a first adhesive layer is applied. The adhesive generally comprises a thermosetting composition so that it is cured in the subsequent moulding operation. It is generally important that the adhesive will not cure until the moulding operation commences and that curing is substantially complete at the end of the moulding operation. Preferred adhesives for use according to the invention are polyurethane adhesive compositions because of their compatibility with the other materials making up the laminated product, and particularly foaming polyurethane adhesives. If desired, such adhesives may be prepared from two or more components which are mixed immediately before use e.g. in a conventional mixing spray head. The rate of cure of the adhesive may be conveniently controlled by varying the material formulation of the adhesive. It is also possible to use, for example, film adhesives, moisture curing adhesives or hot melt sprayable adhesives. It will be appreciated that when film adhesives are used, the film layers are inserted between the various layers of the product at appropriate times in the process. The amount of adhesive applied to the reinforcing layer is generally in the range of 10 to 100 g.m$^{-2}$ preferably about 40 g.m$^{-2}$.

When the reinforcing layer has been coated with the adhesive, the thermoformable cellular core material may be applied. When the laminated product is intended for use where sound-attenuating properties may be desired, such as for use as decorative panels in automotive or aircraft applications, it is preferred to use an open-celled core material. Closed-cell materials may be preferred in other applications. The cellular material may be rigid, semi-rigid or flexible depending on the desired final application. In general, the thermoformable cellular material will be of polyurethane, although other cellular materials, such as thermoplastic foam materials, may be used if desired. For automotive applications, such as for headliners, it is preferred to use a polyurethane thermoformable cellular material which provides good mouldability and product definition.

The core material is preferably pre-cut to a size and thickness appropriate to the desired final product before being placed on the adhesive-coated reinforcing layer. The core material may conveniently be cut from slabstock or from roll material. The cores may also be preformed into a desired shape. For use in headliners, the core material generally has a thickness in the range of from 2 to 30 mm.

When the core material has been placed on the first reinforcing layer, the second reinforcing layer may be laid over the core material. The second reinforcing layer will generally be identical to the first reinforcing layer, but this is not essential. A second adhesive coating is then applied onto the second reinforcing layer. Again it is convenient to employ a similar adhesive composition as that applied in the first coating operation, but this is not essential. The second layer of adhesive penetrates the second reinforcing layer and serves to bond this, when cured, to the core material.

In the final stage for preparing the intermediate laminated element, a decorative layer is applied to the second reinforcing layer. It will be appreciated that, if desired, the second adhesive coating could be applied to the decorative layer rather than to the second reinforcing layer, but this is not preferred. The decorative layer may be any material serving to provide the desired appearance of the final product such as for example woven, non-woven and thermoplastic film materials.

When the decorative layer has been applied, the intermediate laminated product is passed, without substantial pre-heating, to the moulding operation. The mould dies used correspond to the desired shape of the final product and are pre-heated to a temperature to effect deformation of the intermediate laminated product to the desired shape and to cause curing of the adhesive layers. We have found that a moulding temperature in the range of from 120° to 200° C. is convenient and about 180° C. is preferred. If, for example, a heat-sensitive decorative layer is used, it is possible to employ a mould in which the mould part in contact with the decorative layer is at a somewhat lower temperature. The laminated product is generally held in the mould for about 30 to 180 seconds depending upon the moulding properties of the core material and the cure characteristics of the adhesive. The edges of the mould dies are generally such as to nip the top and bottom layers of the laminated element together; this serves to aid trimming of the final product and to prevent subsequent delamination. Other edge-types such as cropped, return, front or reversed edges may be formed on the final product by conventional techniques.

After the moulding step, the laminated product is generally allowed to cool in a cooled former in order to maintain the desired shape and dimensions of the product. If desired, the former may be provided with suction holes to suck air through the product and thus promote cooling.

As indicated above the laminated elements produced in accordance with the invention are particularly suitable for use in the automotive and aircraft industries, for example as decorative panels such as headliners for cars, vans and trucks. In some applications, particularly in the aircraft industry, the elements should be formed using non-flammable or self-extinguishing materials, or by treating the materials with fire-retardant chemicals. Examples of non-flammable cellular core materials include phenol-formaldehyde, polyether sulphone and polyether imide foams, which may be used with non-flammable resin adhesives such as phenol-formaldehyde resins. Polyvinyl fluoride is an example of a non-flammable material which may be used as a decorative layer.

Embodiments of the invention will be hereinafter described by way of non-limiting example with reference to the accompanying drawings, in which:

The FIGURE schematically shows a side view of apparatus for use according to the invention in the production of automobile headliners.

In the apparatus shown in the FIGURE, scrim material is drawn from roller 1 and passed through nip rollers 3 together with first reinforcing layer material drawn from roller 2. The web thereby formed is then passed to the first adhesive coating booth 4, where adhesive is sprayed from nozzles 5. Fumes are withdrawn from the booth 4 with the help of fan 6. The adhesive-coated web then passes to the automatic sheet feed station 7 where the cellular core layer 8 is placed on the coated web. Of course, it is possible to locate the cellular core layer 8 on the coated web manually if desired. The cellular core layer 8 is prepared from slabstock material by apparatus (not shown) for cutting sheets of desired size and thickness.

A second reinforcing layer of material is drawn from roller 9 and overlaid onto the cellular core layer on the web before passing to the second adhesive coating booth 10. Adhesive is sprayed onto the second reinforcing layer from nozzles 11 and fumes are extracted with fan 12. Decorative face material is drawn from roller 13 and applied to the adhesive-coated substrate to form an intermediate laminate product 14. The intermediate laminate product is then gripped at its edges by clips 16 carried by a pair of belts 15 (only one shown) running parallel to the production line. The intermediate laminate product 14 is thereby carried to moulding station 17 and placed between the dies 18, 19 of a double acting press. The dies are electrically heated to a temperature sufficient to mould the thermoformable cellular core and to cure the adhesive. If decorative layer on the intermediate product is heat sensitive, the temperature of the upper die 18 may be lower than that of the lower die 19.

When the dies 18, 19 of the press open, the laminate product is carried to the cooling station 20 where the product is held in another double acting press with dies 21, 22 corresponding the dies 18, 19 of the moulding station 17. The dies 21, 22 are cooled with cold water.

The cooled final laminate product 23 is then carried forward to declamping station 24 where the clips 16 are released and the final product removed.

While the embodiment described above is provided with two reinforcing layers, a core and scrim and decorative layers i.e. to form a laminate having five layers, it will be appreciated that laminated products having more and less layers are within the scope of the invention.

We claim:

1. A method for the manufacture of a laminated element comprising a thermoformed cellular core material and one or more reinforcing and/of decorative layers which comprises a scrim layer and a first reinforcing layer, applying an adhesive coating to said first reinforcing layer, placing a thermoformable cellular core material on the adhesive coated first reinforcing layer, placing a second reinforcing layer on the thermoformable cellular core layer, applying an adhesive to said second reinforcing layer and applying a decorative layer thereon, placing the foregoing composite in a heated mold to deform the thermoformable cellular core material to the desired final shape and to cure the adhesives.

2. A method according to claim 1 wherein the first and second reinforcing layers are substantially identical.

3. A method according to claim 1 wherein the adhesive is a thermosetting composition which is cured in the heated mould.

4. A method according to claim 1 wherein the thermoformable core material is pre-cut to a size and thickness appropriate to the desired final product before being placed on the adhesive coated reinforcing layer.

5. A method according to claim 1 wherein said scrim layer has a layer of material thereon to prevent the adhesive on the first reinforcing layer from penetrating the scrim layer.

6. A method according to claim 1 wherein the thermoformable cellular core material is non-flammable.

7. A method according to claim 1 wherein the adhesives are non-flammable.

8. A method according to claim 1 wherein the heated mold is heated to 120° C. to 200° C.

* * * * *

UNITED STATES PATENT AND TRADEMARK OFFICE
CERTIFICATE OF CORRECTION

PATENT NO. : 4,812,186

DATED : March 14, 1989

INVENTOR(S) : Anthony McConnell et al

It is certified that error appears in the above-identified patent and that said Letters Patent is hereby corrected as shown below:

On the title page assignee should read

--(73) Assignee: John Cotton (Colone) Limited--.

Signed and Sealed this

Thirtieth Day of January, 1990

Attest:

JEFFREY M. SAMUELS

Attesting Officer    Acting Commissioner of Patents and Trademarks